(12) United States Patent
Tamezane et al.

(10) Patent No.: US 11,169,166 B2
(45) Date of Patent: Nov. 9, 2021

(54) AUTOMATIC ANALYZER

(71) Applicant: HITACHI HIGH-TECHNOLOGIES CORPORATION, Tokyo (JP)

(72) Inventors: Hideto Tamezane, Tokyo (JP); Isao Yamazaki, Tokyo (JP); Masaharu Nishida, Tokyo (JP); Ryota Kamoshida, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 742 days.

(21) Appl. No.: 15/552,335

(22) PCT Filed: Feb. 5, 2016

(86) PCT No.: PCT/JP2016/053570
§ 371 (c)(1),
(2) Date: Aug. 21, 2017

(87) PCT Pub. No.: WO2016/136438
PCT Pub. Date: Sep. 1, 2016

(65) Prior Publication Data
US 2018/0031589 A1 Feb. 1, 2018

(30) Foreign Application Priority Data
Feb. 23, 2015 (JP) .............................. JP2015-032752

(51) Int. Cl.
*G01N 35/02* (2006.01)
*G01N 35/00* (2006.01)
(Continued)

(52) U.S. Cl.
CPC ............ *G01N 35/025* (2013.01); *B01L 3/527* (2013.01); *G01N 35/00* (2013.01);
(Continued)

(58) Field of Classification Search
CPC .......... G01N 35/025; G01N 35/00584; G01N 35/00722; G01N 35/1002;
(Continued)

(56) References Cited

U.S. PATENT DOCUMENTS

2013/0121880 A1* 5/2013 Yamazaki .......... G01N 35/1016
422/81
2014/0220693 A1* 8/2014 Yamazaki .......... G01N 35/1016
436/54
(Continued)

FOREIGN PATENT DOCUMENTS

| EP | 2 600 158 A1 | 6/2013 |
| EP | 2 752 667 A1 | 7/2014 |

(Continued)

OTHER PUBLICATIONS

International Search Report of PCT/JP2016/053570 dated Apr. 19, 2016.
(Continued)

*Primary Examiner* — Benjamin R Whatley
(74) *Attorney, Agent, or Firm* — Mattingly & Malur, PC

(57) ABSTRACT

An automatic analyzer which is capable of detecting a dispensing abnormality with a high degree of accuracy without causing the decrease in the determination performance or the increase in the calculation amount caused by the configuration balance of the reference database is implemented. A dispensing nozzle of a sample dispensing mechanism 50 is immersed in a dispensing target contained in a specimen container 11 and sucks the dispensing target, and internal pressure of the dispensing nozzle of the sample dispensing mechanism 50 of ejecting the sucked dispensing target to a reaction container 41 is detected through a pressure sensor 54. A plurality of feature quantities are extracted from a waveform of the detected pressure, and a determination result is output through a linear combination (Continued)

formula using an optimal coefficient for a determination function that receives a plurality of feature quantities and outputs one value. The determination result indicates whether or not dispensing of the sample dispensing mechanism 50 is performed normally in accordance with the magnitude of the output result of the determination function.

6 Claims, 7 Drawing Sheets

(51) Int. Cl.
*G01N 35/10* (2006.01)
*B01L 3/00* (2006.01)

(52) U.S. Cl.
CPC . *G01N 35/00584* (2013.01); *G01N 35/00722* (2013.01); *G01N 35/10* (2013.01); *G01N 35/1002* (2013.01); *G01N 35/1016* (2013.01); B01L 2200/146 (2013.01); B01L 2200/16 (2013.01); B01L 2300/027 (2013.01); B01L 2300/0803 (2013.01); B01L 2400/0487 (2013.01); *G01N 2035/009* (2013.01); *G01N 2035/0091* (2013.01); *G01N 2035/1018* (2013.01); *G01N 2035/1034* (2013.01)

(58) Field of Classification Search
CPC ...... G01N 2035/009; G01N 2035/0091; B01L 3/527; B01L 2200/146; B01L 2200/16; B01L 2300/027; B01L 2300/0803; B01L 2400/0487

See application file for complete search history.

(56) References Cited

U.S. PATENT DOCUMENTS

2015/0219680 A1   8/2015  Mimura et al.
2015/0362514 A1  12/2015  Tamezane et al.

FOREIGN PATENT DOCUMENTS

| JP | 2008224691 | | 9/2008 | | |
|----|------------|---|--------|---|---|
| JP | 201014434  | A | 1/2010 | | |
| JP | 201444174  | A | 3/2014 | | |
| JP | 2014149187 | A | 8/2014 | | |
| WO | 2010001646 | A1 | 1/2010 | | |
| WO | WO-2013031416 | A1 * | 3/2013 | ......... | G01N 35/1016 |
| WO | WO-2014034293 | A1 * | 3/2014 | | |

OTHER PUBLICATIONS

International Preliminary Report on Patentability received in corresponding International Application No. PCT/JP2016/053570 dated Sep. 8, 2017.
Extended European Search Report received in corresponding European Application No. 16755187.8 dated Oct. 5, 2018.

\* cited by examiner

AUTOMATIC ANALYZER

TECHNICAL FIELD

The present invention relates to an automatic analyzer that performs qualitative/quantitative analysis for a biometric specimen such as blood or urine.

BACKGROUND ART

An automatic analyzer is a device that performs qualitative/quantitative analysis by adding a reagent specifically reacting with a specific component included in a biometric specimen (hereinafter referred to as a "specimen") such as blood or urine, reacting them, and measuring absorbance or an amount of luminescence.

In this automatic analyzer, in order to react the specimen with the reagent, a process of dispensing a specimen serving as an analysis target contained in a specimen container or a reagent to be added to and react with a specimen to a reaction container is necessary. Since an amount of the specimen or the reagent dispensed to the reaction container is small, the dispensing accuracy has large influence on the analysis accuracy inevitably.

Therefore, it is important to reliably detect a dispensing abnormality that leads to a decrease in the dispensing accuracy.

In the process of dispensing the specimen to the reaction container, one of factors that frequently causes the dispensing abnormality is probe clogging caused by suction of a solid foreign substance such as fibrin. If the clogging occurs in the probe, a predetermined amount of specimen is unable to be dispensed to the reaction container, and thus a reliable analysis result is unable to be obtained.

Further, when there are bubbles or a liquid film on a liquid level of a specimen to be tested, the bubbles or the liquid film are determined to be the liquid level, an amount of specimen that has to be sucked originally is unable to be sucked, leading to a dispensing abnormality. In order to prevent the dispensing abnormality when there are the bubbles or the liquid film, an immersion amount of the probe in the specimen to be tested may be increased, but if the immersion amount of the probe in the specimen is increased, contamination may increase, and thus, an analysis result may be adversely affected.

In this regard, in order to minimize the immersion depth of the probe in the liquid, a technique of detecting a liquid level of a liquid in a container, stopping a downward movement of the probe at a position at which a leading end of the probe reaches slightly below the liquid level, and controlling an operation such that a predetermined amount of liquid is sucked into the probe is commonly employed. As a means for detecting the liquid level of the specimen to be tested, a capacitance change technique for detecting a change in capacitance when the probe contacts the liquid level is most commonly used.

However, when a liquid level sensor is used, as described above, if there are bubbles or a liquid film on the liquid level, they are likely to be erroneously detected as the liquid level, leading to a dispensing abnormality.

In the process of dispensing the reagent to the reaction container, the dispensing abnormality may occur when air bubbles generated on a reagent liquid level are sucked. If the immersion amount of the probe in the reagent is increased as in the case of the specimen, contamination may increase, and thus an analysis result may be adversely affected. For this reason, it is common to employ a probe operation control technique similar to that in the case of the specimen.

As a technique of detecting the dispensing abnormality, for example, PTL 1 discloses an automatic analyzer including a probe that sucks or ejects a sample (specimen), at least one pressure sensor that detects pressure in a dispensing flow channel connecting a dispensing syringe for generating pressure for causing the probe to suck or eject the sample, a pressure value storage means that chronologically stores an output value of the pressure sensor during an operation of dispensing the sample, and a storage means that stores a reference database including chronological output values of the pressure sensor when the sample is normally sucked into or ejected from the probe, wherein a Mahalanobis distance is calculated from comparison data created based on the output value of the pressure sensor chronologically stored in the pressure value storing means and the reference database, and a dispensing abnormality of the sample is determined by comparing a calculation result with a predetermined threshold value.

CITATION LIST

Patent Literature

PTL 1: Japanese Patent Application Laid-Open No. 2008-224691

SUMMARY OF INVENTION

Technical Problem

However, the related art has the following two problems.

Firstly, there are cases in which determination performance depends on configuration balance of data constituting the reference database. This is because in the technique using the Mahalanobis distance, determination about whether it is right or wrong is performed on the basis of a distance from the center of gravity of the reference database. In the case in which the data configuration of the reference database is biased, the position of the center of gravity is also affected by the bias, and thus an erroneous determination rate may be increased. In the case of detecting an abnormality in which a pressure variation difference with a normal one is relatively small as in the dispensing abnormality caused by bubble sucking, this problem is particularly important, and many time and efforts may be taken for adjustment of the reference database for optimizing the balance.

Secondly, a calculation amount may be enormously increased with an increase in the number of feature quantities (information extracted from a pressure waveform). In order to increase the determination performance, it may be important to increase the number of feature quantities, but a time usable for a calculation is limited. Further, the calculation may be not completed depending on the number of feature quantities, and it may be necessary to improve the performance of microcomputers or the like in order to complete the calculation within a predetermined time. If the calculation amount is increased as described above, it may be necessary to set a limit to the number of feature quantities, and the cost may be increased. If the calculation amount is increased, there is a problem caused by a Mahalanobis distance calculation formula.

The present invention was made in light of the foregoing, and it is an object of the present invention to implement an automatic analyzer which is capable of detecting a dispensing abnormality with a high degree of accuracy without causing the decrease in the determination performance or the increase in the calculation amount caused by the configuration balance of the reference database.

Solution to Problem

In order to achieve the above object, the present invention may have the following configuration.

An automatic analyzer of the present invention includes a reaction disk on which a plurality of reaction containers are arranged, a sample dispensing mechanism including a sample dispensing nozzle that sucks a sample contained in a sample container and ejects the sample to a reaction container arranged on the reaction disk, a reagent disk on which a plurality of reagent containers are arranged, a reagent dispensing mechanism including a reagent dispensing nozzle that sucks a reagent contained in the reagent container and ejects the reagent to the reaction container arranged on the reaction disk, a spectroscopic detector that detects light transmitting a solution contained in the reaction container, a pressure sensor that detects internal pressure of the sample dispensing nozzle, and a control unit that controls operations of the reaction disk, the sample dispensing mechanism, the reagent disk, the reagent dispensing mechanism, and the spectroscopic detector.

The control unit calculates a plurality of feature quantities from a waveform of the pressure detected by the pressure sensor, calculates one output value from the plurality of feature quantities through a determination function serving as a linear combination formula using an optimal coefficient, and determines whether or not the sample is normally sucked or ejected by the sample nozzle on the basis of the calculated one output value.

The automatic analyzer further includes a display unit, wherein, when the sample is determined not to be normally sucked or ejected by the sample nozzle, the control unit causes information indicating that there is a dispensing abnormality to be displayed on the display unit, and controls the reaction disk, the sample dispensing mechanism, the reagent disk, the reagent dispensing mechanism, and the spectroscopic detector such that an analysis operation for a next sample is performed.

Advantageous Effects of Invention

According to the present invention, it is possible to implement an automatic analyzer which is capable of detecting a dispensing abnormality with a high degree of accuracy without causing the decrease in the determination performance or the increase in the calculation amount caused by the configuration balance of the reference database.

DESCRIPTION OF EMBODIMENTS

Hereinafter, exemplary embodiments of the present invention will be described with reference to the accompanying drawings.

EMBODIMENTS

First Embodiment (1) Overall Structure of Automatic Analyzer

Figure 1:
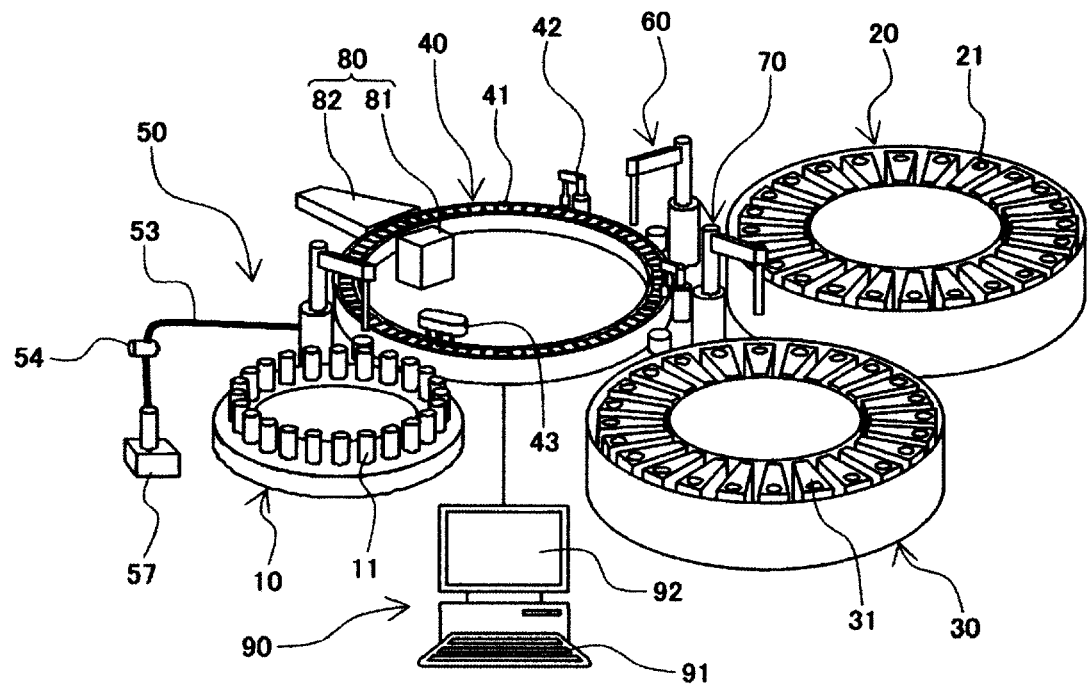
FIG. 1 is an overall schematic configuration diagram of an automatic analyzer to which the present invention is applied.

FIG. 1 is an overall schematic configuration diagram of an automatic analyzer to which the present invention embodiment is applied.

Referring to FIG. 1, an automatic analyzer includes a sample disk 10, a first reagent disk 20, a second reagent disk 30, a reaction disk 40, a sample dispensing mechanism 50, a first reagent dispensing mechanism 60, a second reagent dispensing mechanism 70, a photometric mechanism 80, and a control device 90.

On the sample disk 10, a plurality of specimen containers 11 each containing a biometric specimen such as blood or urine serving as an analysis target are arranged and loaded side by side in a circumferential direction. The sample disk 10 is rotationally driven by a rotary drive device (not illustrated) and conveys the specimen containers 11 in the circumferential direction.

On the first reagent disk 20, a plurality of reagent containers 21 each containing a reagent (a first reagent) used for analysis of the specimen are arranged and loaded side by side in the circumferential direction. The first reagent disk 20 is rotationally driven in the circumferential direction by a rotary drive device (not illustrated) and conveys the reagent containers 21 in the circumferential direction.

On the second reagent disk 30, a plurality of reagent containers 31 each containing a reagent (a second reagent) used for analysis of the specimen are arranged and loaded side by side in the circumferential direction. The second reagent disk 30 is rotationally driven in the circumferential direction by a rotary drive device (not illustrated) and conveys the reagent containers 31 in the circumferential direction.

On the reaction disk 40, a plurality of reaction containers 41 each containing a liquid mixture (a reaction solution) of the specimen and the reagent are arranged and loaded side by side in the circumferential direction. The reaction disk 40 is rotationally driven in the circumferential direction by a rotary drive device (not illustrated) and conveys the reaction containers 41 in the circumferential direction. An agitating mechanism 42 for agitating the liquid mixture contained in the reaction container 41 and a cleaning mechanism 43 for cleaning the reaction containers 41 in which analysis has been completed are arranged on a conveyance path for the reaction containers 41 on the reaction disk 40.

The sample dispensing mechanism 50 dispenses the specimen by immersing a dispensing nozzle (dispensing probe) 51 (illustrated in FIG. 2) in the specimen of the dispensing target contained in the specimen container 11, sucking the specimen, and ejecting the specimen to the reaction container 41. The sample dispensing mechanism 50 is driven in horizontal and vertical directions by a driving device (not illustrated). The sample dispensing mechanism 50 includes a dispensing flow channel 53, a pressure sensor 54, and a metering pump 57. The sample dispensing mechanism 50 will be described later in detail.

The first reagent dispensing mechanism 60 dispenses the first reagent by immersing a dispensing nozzle (not illustrated) in the first reagent of the dispensing target contained in the reagent container 21, sucking the first reagent, and ejecting the first reagent to the reaction container 41. The first reagent dispensing mechanism 60 is driven in the horizontal and vertical directions by a driving device (not illustrated).

The second reagent dispensing mechanism 70 dispenses the second reagent by immersing a dispensing nozzle (not illustrated) in the second reagent of the dispensing target contained in the reagent container 31, sucking the second reagent, and ejecting the second reagent to the reaction container 41. The second reagent dispensing mechanism 70 is driven in the horizontal and vertical directions by a driving device (not illustrated).

The photometric mechanism 80 is arranged on the conveyance path for the reaction container 41 on the reaction disk 40, and includes a light source 81 that irradiates the reaction container 41 containing a reaction solution of a measurement target with light and a spectroscopic detector 82 that detects transmitted light that has transmitted the reaction solution contained in the reaction container 41. A detection result of the spectroscopic detector 82 is converted into a digital signal and transmitted to the control device 90.

The control device 90 controls an operation of the automatic analyzer including the driving devices in general, controls an analysis process of analyzing the specimen such as blood or urine serving as an analysis target, an abnormality determination process of determining an abnormality in each of the dispensing mechanisms 50, 60, and 70 associated with the analysis process, and the like, and includes an input device 91 that is used to input various kinds of setting values and commands and the like, and a display device 92 that displays various kind of setting screens, analysis result screens, and the like.

(1-1) Dispensing Mechanisms 50, 60, and 70

Figure 2:
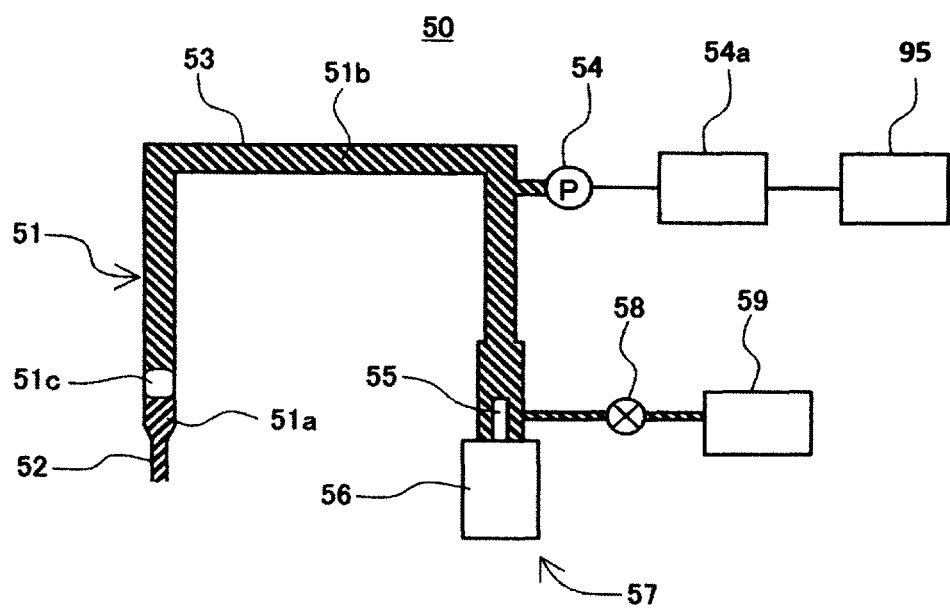
FIG. 2 is a diagram schematically illustrating an internal configuration of a representative sample dispensing mechanism among a plurality of sample dispensing mechanisms.

FIG. 2 is a diagram schematically illustrating an internal configuration of a representative sample dispensing mechanism 50 among a plurality of sample dispensing mechanisms.

As illustrated in FIG. 2, the sample dispensing mechanism 50 includes a dispensing nozzle 51 including a dispensing flow channel 53 in which a specimen 51$a$ and a system liquid 51$b$ pass, a metering pump 57 that causes the dispensing nozzle 51 to suck or eject the sample 51$a$, the system liquid 51$b$, separation air 51$c$, or the like, a pressure sensor 54 that detects pressure inside the dispensing nozzle 51 (that is, inside the dispensing flow channel 53), a pump 59 connected to the dispensing flow channel 53, and a valve 58 provided in a flow path between the dispensing flow channel 53 and the pump 59. The separation air 51$c$ described above is air for separating the sample 51$a$ from the system liquid 51$b$.

A throttle section 52 having a sectional area smaller than the remaining part of the dispensing flow channel 53 is formed at one end of the dispensing nozzle 51 which is immersed in the reagent.

The metering pump 57 is connected to the other end of the dispensing nozzle 51, and a capacity in the dispensing flow channel 53 is adjusted by causing a plunger 55 to be inserted into the dispensing flow channel 53 and extracted from the dispensing flow channel 53 through a drive mechanism 56, and thus the specimen and the like are sucked or ejected from the throttle section 52.

The pump 59 supplies the system liquid 51$b$ to a dispensing path 53 and is controlled through the control device 90 together with an open/close state of the valve 58.

A result of detecting pressure in the dispensing nozzle 51 through the pressure sensor 54 is sent to the control device 90 via an A/D converter 54$a$.

Each of the first and second reagent dispensing mechanisms 60 and 70 has a configuration similar to the sample dispensing mechanism 50, and thus illustration and detailed description thereof are omitted.

(1-2) Control Device 90

Figure 3:
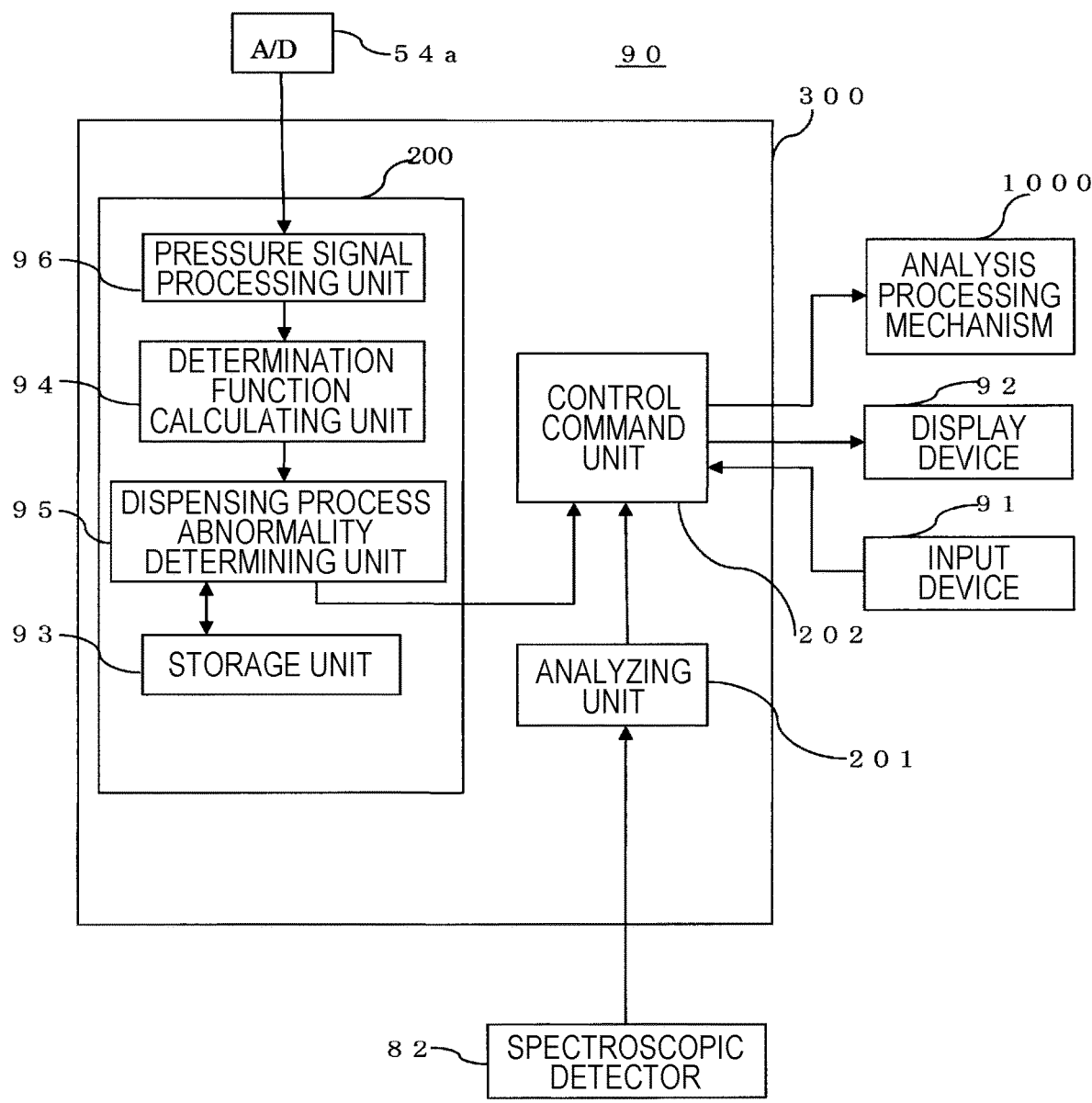
FIG. 3 is a functional block diagram illustrating a control device in detail.

FIG. 3 is a functional block diagram illustrating the control device 90 in detail.

Referring to FIG. 3, the control device 90 includes a control unit 300 in addition to the input device 91 and the display device 92.

The control unit 300 includes a determining unit 200 configured with a pressure signal processing unit 96 that calculates a feature quantity for a digital signal of a pressure signal transmitted from the A/D converter 54$a$ of each of the dispensing mechanisms 50, 60, and 70, a determination function calculating unit 94 that performs an operation using a predetermined determination function using the reference data including the feature quantity calculated by the pressure signal processing unit 96 and data acquired under a normal condition and an abnormal condition, a storage unit 93 that stores various kinds of information used for the operation of the automatic analyzer such as the analysis process and the abnormality determination process, and a dispensing process abnormality determining unit 95 that compares a threshold value stored in the storage unit 93 for use in an abnormality determination process of the dispensing process and a value calculated by the determination function calculating unit 94 and performs the abnormality determination process of the dispensing process.

Further, the control unit 300 is equipped with an analyzing unit 201 that is supplied with spectroscopic data from the spectroscopic detector 82 and analyzes the specimen and a control command unit 202. The control command unit 202 causes the analysis result obtained from the analyzing unit 201 to be displayed on the display device 92 or the like. Further, the control command unit 202 controls an operation of an analysis processing mechanism (the first and second reagent disks 20 and 30, the sample disk 10, the reaction disk 40, the sample dispensing mechanism 50, the first and second reagent dispensing mechanisms 60 and 70, the photometric mechanism 80, and the like) on the basis of an abnormality determination result obtained from the dispensing process abnormality determining unit 95. The control command unit 202 controls the operation of the analysis processing mechanism 1000 in order to perform a normal analysis operation.

(2) Analysis Process

A basic operation of the analysis process of the automatic analyzer according to the first embodiment of the present invention will be described.

In the analysis process, the qualitative/quantitative analysis is performed by adding and reacting reagent that specifically reacts with a specific component contained in the specimen such as blood or urine and measuring the absorbance of the reaction solution.

In FIG. 1, the specimen (sample) of the analysis target is contained in the specimen container 11 and loaded on the sample disk 10. Further, information (an analysis item, a reagent type, and the like) necessary in the analysis process for each specimen is inputted to and stored through the input device 91 of the control device 90 in advance.

Then, dispensing is performed by sucking a certain amount of specimen from the specimen container 11 through the dispensing probe 51 of the sample dispensing mechanism 50 (illustrated in FIG. 2) and ejecting the sucked specimen to the reaction container 41 loaded on the reaction disk 40.

Then, dispensing is performed by sucking a fixed amount of reagent from the reagent containers 21 and 31 and ejecting the sucked reagent to the reaction container 41 of the reaction disk 40 through the first and second reagent dispensing mechanisms 60 and 70, and agitation is performed through the agitating mechanism 42. A type, amount, timing, and the like of the reagent dispensed through the first and second reagent dispensing mechanisms 60 and 70 are decided in advance in accordance with a type of specimen, an analysis item, or the like.

Then, the reaction disk 40 periodically performs rotation and stop, and photometry is performed at a timing at which the reaction container 41 passes through the photometric mechanism 80 (that is, at which it passes between the light source 81 and the spectroscopic detector 82). The photometry is repeatedly performed through the spectroscopic detector 82 during a predetermined reaction time, and thereafter the reaction container 41 in which the analysis has been completed is cleaned through the cleaning mechanism 43. The photometry performed by the photometric mechanism 80 is performed on a plurality of specimen containers 41 in parallel. A detection result obtained by the photometric mechanism 80 is transmitted to the control unit 300 of the control device 90, and a concentration of a component corresponding to the type of analysis is calculated and displayed on the display device 92.

(2-1) Dispensing Process

Next, a basic operation of the dispensing process performed by the dispensing mechanism in the analysis process will be described.

Here, the sample dispensing mechanism 50 will be described as a representative of the dispensing mechanisms 50, 60, and 70.

In FIGS. 1 and 2, in the dispensing process (that is, the specimen dispensing process) performed by the sample dispensing mechanism 50, the dispensing is performed by performing sucking in the state in which the dispensing probe 51 is immersed in the specimen serving as the dispensing target and ejects the specimen to the predetermined reaction container 41.

First, the control device 90 opens the valve 58, fills the inside of the dispensing flow channel 53 of the dispensing probe 51 with the system liquid 51b supplied the from pump 59, and closes the valve 58 before the specimen is sucked. Then, in a state in which the leading end of the dispensing probe 51 is in the air, the plunger 55 is moved down through the drive mechanism 56, and the separation air 51c is sucked.

Then, the dispensing probe 51 is moved down into the specimen container 11, and the leading end of the dispensing probe 51 is immersed in the specimen, and in this state, the plunger 55 is further moved downward, and the specimen is sucked into the throttle section 52 and the dispensing flow channel 53 of the dispensing probe 51. Thereafter, in the state in which the dispensing probe 51 is moved onto the reaction container 41, the plunger 55 is moved up through the drive mechanism 56, and the specimen is ejected until a leading end opening of the dispensing probe 51 reaches the separation air 51c.

The pressure of the dispensing flow channel 53 of the dispensing probe 51 when the specimen is sucked or ejected by the dispensing probe 51 is detected by the pressure sensor 54, converted into digital information by the A/D converter 54a and transmitted to the determining unit 200 of the control unit 300 in the control device 90.

The determining unit 200 of the control unit 300 in the control device 90 performs the abnormality determination process of determining the presence or absence of an abnormality in each of the dispensing mechanisms 50, 60, and 70 from the detection result of the pressure sensor 54a (that is, the pressure waveform at the time of suction and ejection), and when it is determined that there is an abnormality, the analysis processing mechanism 1000 temporarily stops the analysis process in accordance with a command transmitted from the control command unit 202, gives a notification to an operator, for example, by causing an alarm or the like to be displayed on the display device 92, and urges a recovery operation.

As the recovery operation, one of re-dispensing for removing a cause of an occurred abnormality, transition to analysis for another specimen, stopping of a device is selected. A different recovery operation is assumed to be able to be used in accordance with a cause of an occurred abnormality.

After the specimen is ejected, the dispensing probe 51 is cleaned by the flow of system liquid 51b by the opening/closing of the valve 58 and prepares for a next dispensing process.

(2-2) Abnormality Determination Process

The abnormality determination process is a process of determining an abnormality in the dispensing process in each of the dispensing mechanisms 50, 60, and 70. The description will proceed reference to FIGS. 1 and 3.

In the abnormality determination process, the determination function calculating unit 94 applies a feature quantity of determination target data calculated from a pressure waveform (that is, the detection result of the pressure sensor 54) when the target (specimen or reagent) is sucked or ejected by the dispensing nozzle 51 of each of the dispensing mechanisms 50, 60, and 70 to a predetermined determination function, and performs a calculation.

The dispensing process abnormality determining unit 95 compares a value output from the determination function calculating unit 94 with a threshold value stored in the storage unit 93 and determines a dispensing abnormality of each of the dispensing mechanisms 50, 60, and 70 on the basis of a comparison result. The threshold value stored in the storage unit 93 is decided for each target of the dispensing process or for each dispensing amount in advance.

(2-2.1) Decision of Determination Function

Figure 4:
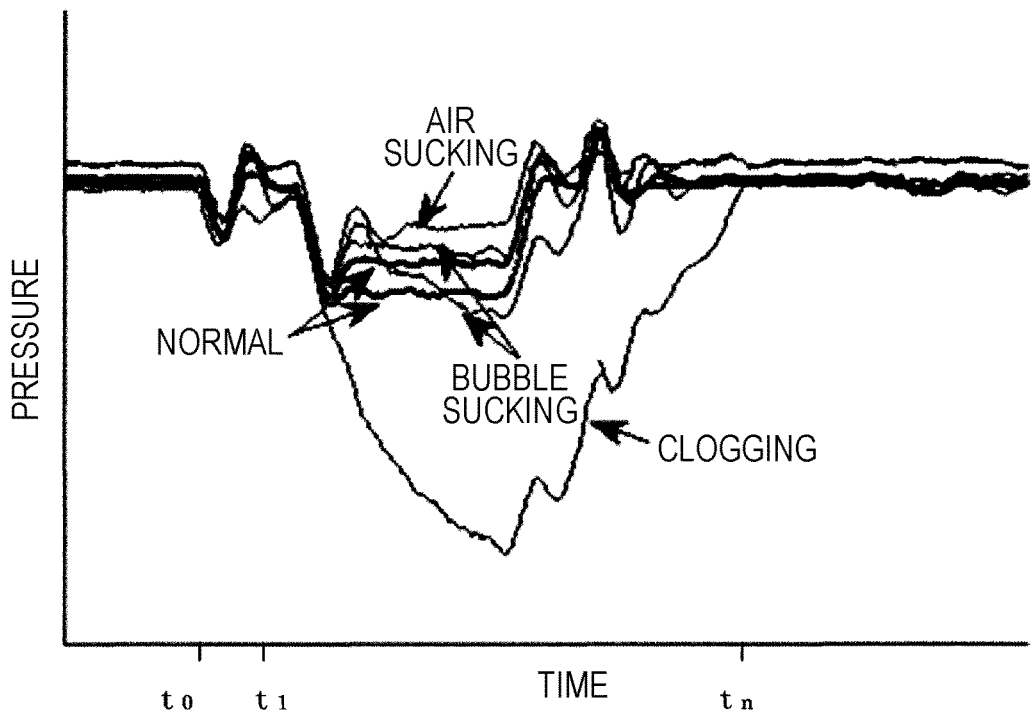
FIG. 4 is a diagram illustrating an example of a pressure waveform when a specimen or a reagent is sucked according to a first embodiment of the present invention.

FIG. 4 is a diagram illustrating an example of a pressure waveform when the specimen or the reagent is sucked according to first embodiment of the present invention. Referring to FIG. 4, a waveform indicated by a dark solid line indicates a case where dispensing is normally performed, and waveforms indicated by thin solid lines indicate cases in which air sucking, bubble sucking, and clogging occur, that is, a case in which dispensing is not normally performed.

The cause that dispensing is not normally performed includes clogging, bubble sucking, and air sucking of dispensing nozzle 51, but a form in which the pressure waveform changes differs depending on the cause. Although the cause is the same, for example in the case of the bubble sucking, the form in which the pressure waveform changes differs depending on a size of a bubble, a timing at which bubbles are sucked, or the like. Even when dispensing is normally performed, the waveform changes due to various reasons such as a viscosity of a sucked liquid or a position of the dispensing nozzle.

In order to quantify a shape of the pressure waveform, n feature quantities $(x_1, x_2, \ldots, x_n)$ are calculated from the pressure waveform using a predetermined method. As the feature quantity, an average value within a divided interval (time), a peak position, a peak height, or the like may be used. The feature quantities form an n-dimensional feature quantity space in which individual feature quantities are used as coordinates.

The reference data is acquired in advance under a condition of normal dispensing and a condition in which an abnormality is simulated.

Figure 5:
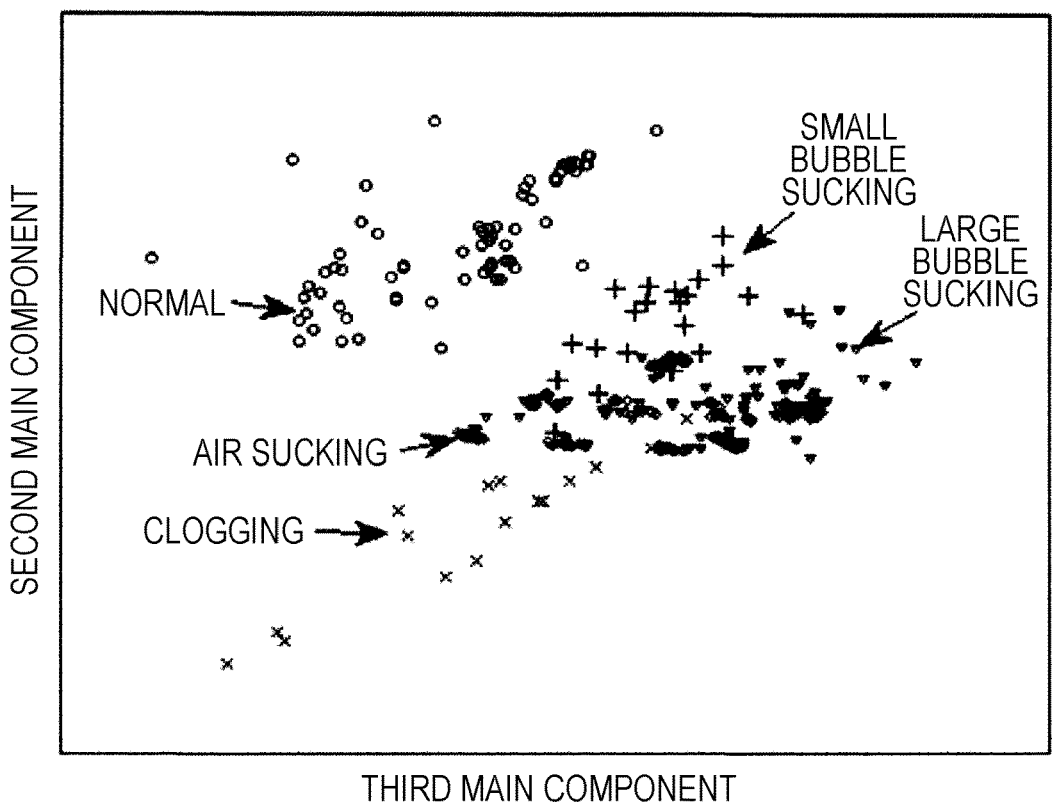
FIG. 5 is a diagram illustrating a distribution of feature quantities calculated from reference data.

FIG. 5 is a diagram illustrating a distribution of the feature quantities calculated from the reference data, that is, a scatter diagram on a plane obtained by performing principal component analysis on a feature quantity distribution. In FIG. 5, a circle mark indicates a normal case, a +mark indicates small bubble sucking, an inverse triangle mark indicates large bubble sucking, a x mark indicates clogging, and a black circle indicates air sucking.

It is understood that normal reference data and abnormal reference data are widely distributed on the principal component plane. Further, data of some conditions is illustrated here, and if data of all conditions are displayed, overlapping of a normal distribution and an abnormality distribution occurs even on the principal component plane.

Figure 6:
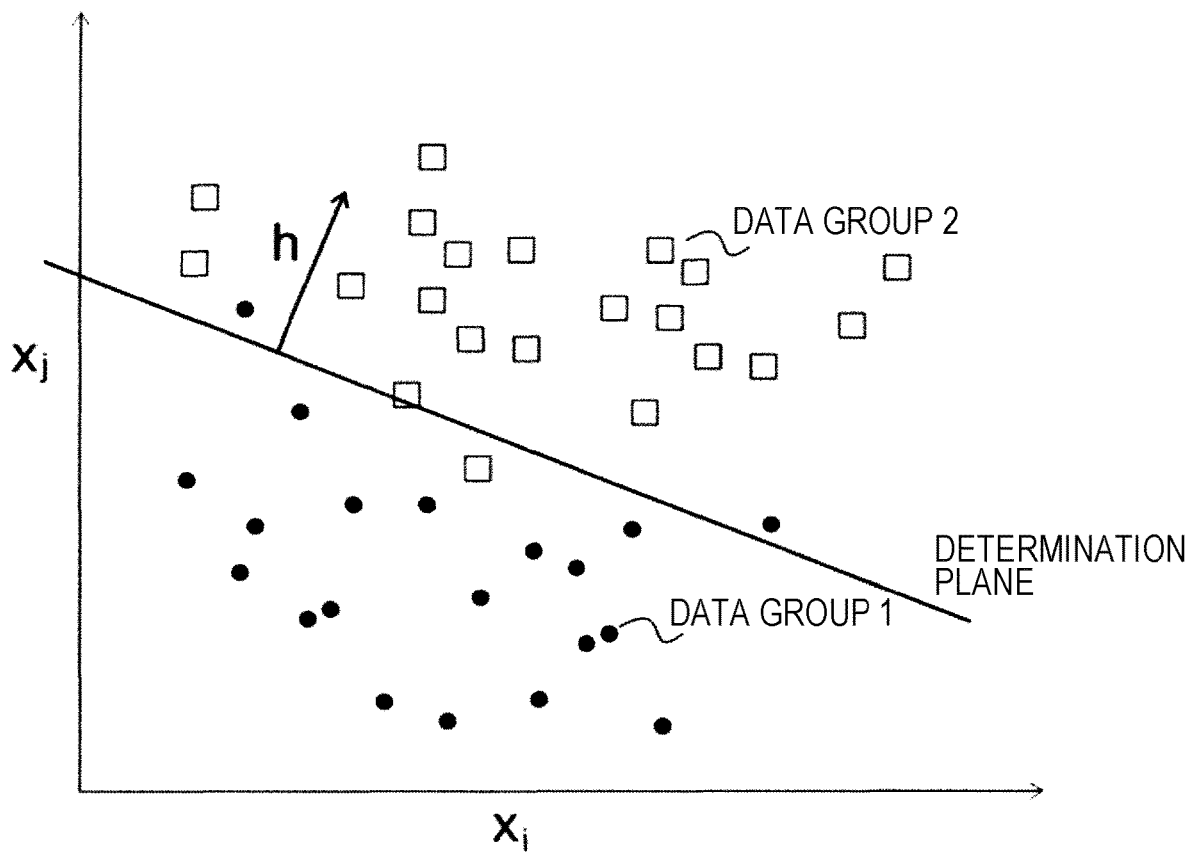
FIG. 6 is a diagram illustrating a technique of calculating a determination formula.

Next, a technique of calculating a determination formula will be described with reference to FIG. 6. FIG. 6 is a diagram illustrating a distribution of data within a plane indicated by two coordinates in the feature quantity space. There are assumed to be two data groups 1 and 2. The data group 1 may be regarded to be the normal reference data, and the data group 2 may be regarded to be the abnormal reference data. A determination surface which is a general technique is considered. The determination surface is a straight line on a two-dimensional plane, but the determination surface is a plane in a three-dimensional space and a hyperplane in an n-dimensional space. A new coordinates h in a direction orthogonal to the determination surface is considered. A value of the coordinate h can be considered to be a distance from the determination surface of each data point. It is indicated by the following formula (1).

$$h = k_1 x_1 + k_2 x_2 + \ldots k_n x_n + C \quad (1)$$

In Formula (1), $k_1, k_2, \ldots k_n$ indicates a direction cosine of a normal vector of the determination surface.

Here, a function called a cost function q is defined. The cost function q indicates a cost for the presence of data belonging to a certain data group at certain coordinates in the feature quantity space. The cost function is defined under the assumption that the cost is low if the coordinates are within a region in which data exists normally, but the cost is high in a region in which data rarely exists.

In this definition, parameters k and C which are not decided are included. For the non-decided parameters k and C, the cost is calculated for each of the data points in the reference data group, and optimization is performed so that a sum is minimum.

A determination formula to be described later is generated using the finally optimized parameters.

Figure 7:
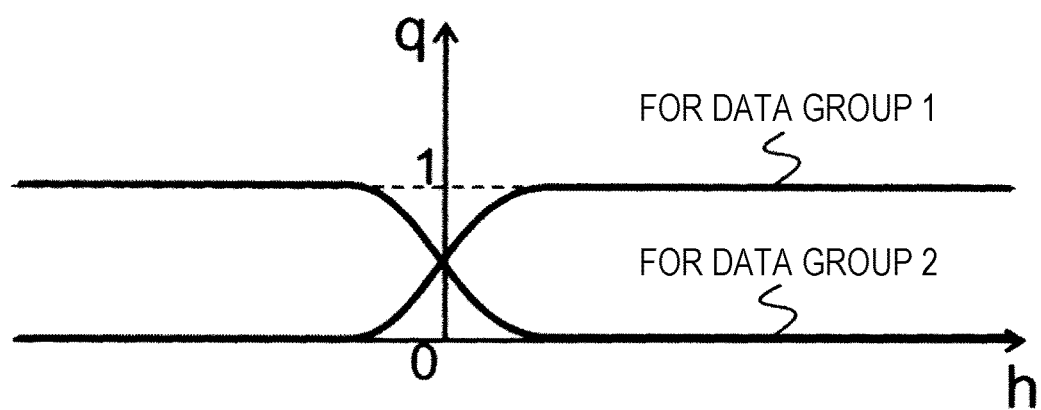
FIG. 7 is an explanatory diagram of a cost function q.

At h for each data point, a function called a cost function q is calculated. FIG. 7 is an explanatory diagram of the cost function q. The cost function q has a shape as illustrated in FIG. 7. In other words, if a distance from a predetermined determination surface in the vertical direction in the feature quantity space is increased, it converges to a certain value, and the cost function q for the data group 1 has a value of 0 when h is smaller than 0, a value of 1 when h is larger than 0, and an intermediate value between 0 and 1 when h is close to 0. The cost function q for the data group 2 has a value of 1 when h is smaller than 0, a value of 0 when h is larger than 0, and an intermediate value between 0 and 1 when h is close to 0. A logit function or a probit function can be used for this function, but the function need not be limited to it.

The cost functions q for the normal reference data and the abnormal reference data are calculated, and values of the parameters $k_1, k_2, \ldots k_n$ and C in which a sum is minimized are calculated. The determination surface decided under that condition is a surface in which the data group 1 and the data group 2 can be optimally separated.

In other words, it is decided such that when the data group 1 and the data group 2 are able to be completely separated by the determination surface, the data points distributed near the determination surface are positioned as far as possible from the determination surface, and even when the data group 1 and the data group 2 are unable to be completely separated, the number of data traversing the determination surface is minimized. An optimization algorithm is used for the search for the values of the parameters $k_1, k_2, \ldots k_n$ and C so that a sum is minimized.

Particularly, an optimal coefficient when a logit function or a probit function is used as the cost function can be decided by a calculation using a generalized linear model, for example, using commercially available application software such as MALTA (registered trademark).

A determination function f is decided as in the following Formula (2) as the linear combination formula of the feature quantity using the values of the parameters $k_1, k_2, \ldots k_n$ and C optimized as described above.

$$f = k_1 x_1 + k_2 x_2 + \ldots k_n x_n + C \quad (2)$$

A determination formula using the determination function f is defined as in the following Formulas (3) and (4).

$$f < 0 \ldots \text{determined to be normal} \quad (3)$$

$$f \geq 0 \ldots \text{determined to be abnormal} \quad (4)$$

The determination formula for determining whether dispensing is normal or abnormal is not limited to Formulas (3) and (4) but may be a polynomial. Since Formulas (3) and (4) are most convenient, in the first embodiment, Formulas (3) and (4) are defined as the determination formula.

The reason for using Formulas (3) and (4) as the determination formula is that Formulas (3) and (4) are region divisions decided so that the cost calculated for the reference data group is minimized, and thus in the case of data generated from the same population as the reference data group in which dispensing is normal or abnormal, the cost is decreased similarly.

Further, when an output value of the determination function is close to a predetermined threshold value, it is possible to determine whether or not the sample is normally sucked by or ejected from the sample nozzle by changing a coefficient of the linear combination formula of the determination function or the threshold value.

Figure 8:
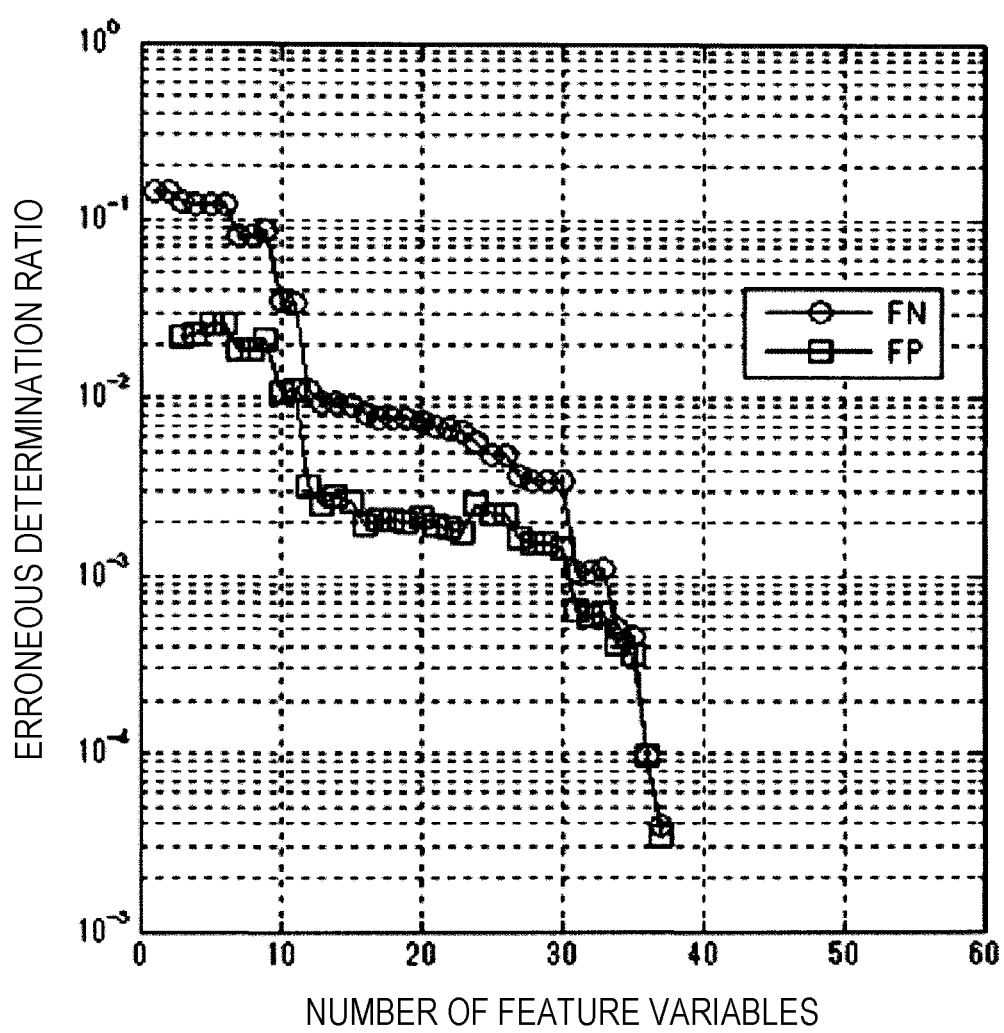
FIG. 8 is a diagram illustrating an example of a result of acquiring normal reference data and abnormal reference data and conducting an experiment of verifying a determination ability.

FIG. 8 is a diagram illustrating an example of a result of performing an experiment for acquiring the normal reference data and the abnormal reference data in an actual dispensing system and verifying the determination ability.

In FIG. 8, a horizontal axis indicates the number n of feature quantities, and a vertical axis indicates an erroneous determination ratio. The erroneous determination ratio is the ratio obtained by dividing each of FP and FN by the number of all pieces of data when the FP (a circle mark) indicates a case in which normal is erroneously determined to be abnormal, and the FN (a square mark) indicates a case in which abnormal is erroneously determined to be normal. In the example illustrated in FIG. 8, the erroneous determination is $\frac{1}{1000}$ or less when the number n of feature quantities is 30 or more, and no erroneous determination occurs when n is 40 or more, and thus 40 or more is assumed to be used as the number of feature quantities.

As can be seen from FIG. 4, as a variation duration of the pressure waveform in the system illustrated here, a period from a time $t_0$ to a time $t_n$ is the variation duration, and as a dominant vibration period of the pressure variation, a period from the time $t_0$ to the time $t_1$ is considered to be about one cycle, and thus the variation duration is about 10 times as large as the dominant vibration period.

For this reason, the number of necessary feature quantities can be estimated to be about four times as large as a value obtained by dividing a suction or ejection time by a fluid cycle. In other words, since the number of feature quantities is 40 or more, and the variation duration is about 10 times as large as the dominant vibration period, the number of necessary feature quantities is determined to be about 4 times as large as the value obtained by dividing the suction or ejection time by the fluid cycle $(40/\{(t_0 \text{ to } t_n)/(t_0 \text{ to } t_n)\}=4)$.

Of course, in different systems, there are cases in which the number of necessary feature quantities changes, and sufficient determination can be performed with few feature quantities.

(2-2.2) Operation of Abnormality Determination Process

Figure 9:
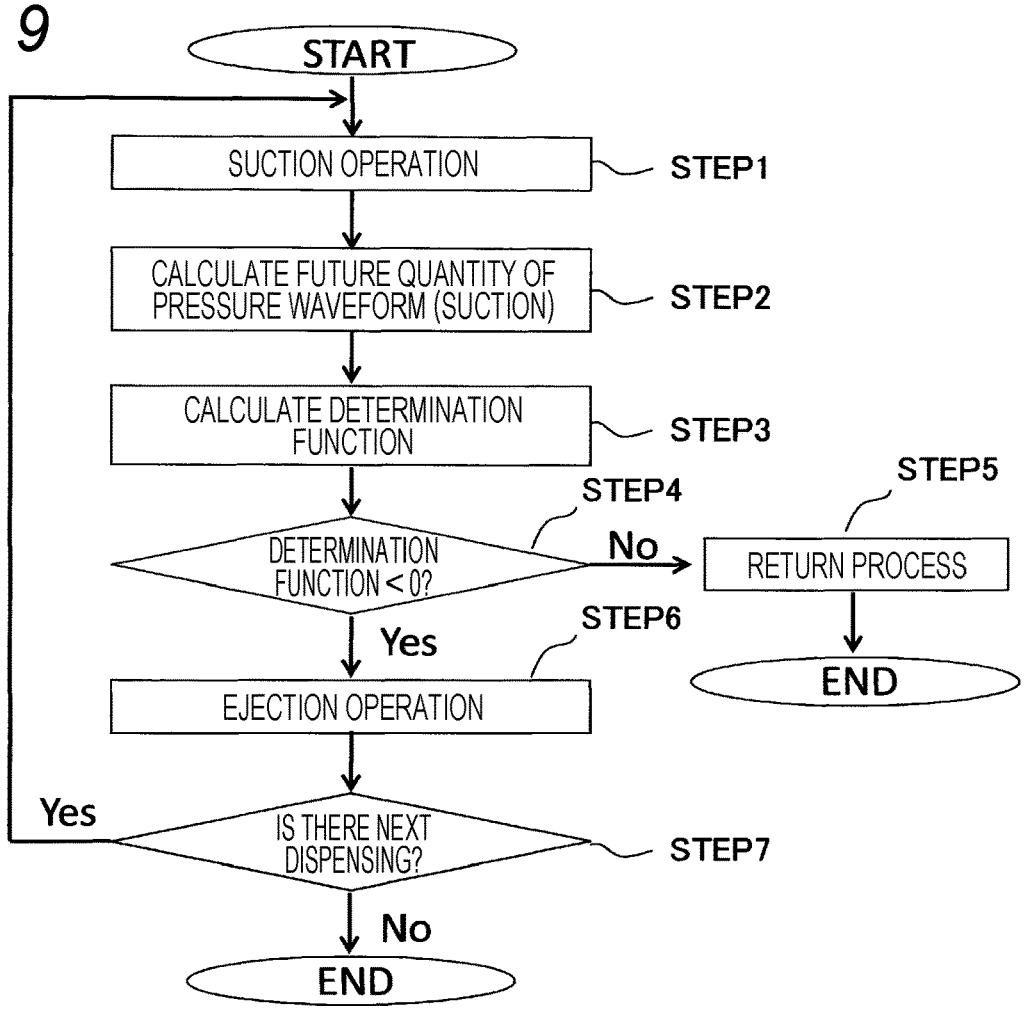
FIG. 9 is a flowchart illustrating an abnormality determination process.

FIG. 9 is a flowchart illustrating the abnormality determination process.

In FIG. 9, the operation of the sample dispensing mechanism 50 is described as an example, but the abnormality determination process is similarly performed even for the first reagent dispensing mechanism 60 and the second reagent dispensing mechanism 70. For this reason, the operations of the first reagent dispensing mechanism 60 and the second reagent dispensing mechanism 70 are similar to the operation of the sample dispensing mechanism 50, and detailed description thereof will be omitted.

In FIG. 9, in the control device 90, when an instruction to start the analysis is given, the sample dispensing mechanism 50 performs the suction operation of the dispensing process (STEP 1), and the pressure signal processing unit 96 in the determining unit 200 calculates a feature quantity of determination target data for the digital signal of the pressure waveform transmitted from the A/D converter 54a (STEP 2).

Then, the determination function calculating unit 94 calculates the determination function f using the feature quantity of the determination target data transmitted from the pressure signal processing unit 96, and outputs one value (STEP 3).

Then, the dispensing process abnormality determining unit 95 determines whether or not the value which is calculated and transmitted by the determination function calculating unit 94 is smaller than a threshold value stored in the storage unit 93, that is, whether or not the value is smaller than 0 (STEP 4).

When the determination result in STEP 4 is NO (abnormal dispensing), the control command unit 202 gives an operation command to the analysis processing mechanism 1000 and the display device 92, the recovery process is performed (STEP 5), and the process ends. The recovery process is a process in which the dispensing process abnormality determining unit 95 issues information indicating that there is a suction abnormality, and an operation of proceeding to an alarm process by the display device 92 (a process of displaying information indicating that there is a dispensing abnormality) and a next specimen process performed by the analysis processing mechanism 1000 is performed.

On the other hand, when the determination result in STEP 4 is YES (normal dispensing), the control command unit 202 gives an operation command to the analysis processing mechanism 1000, and the ejection operation is performed (STEP 6). Then, the control unit 300 determines whether there is next dispensing (STEP 7).

If the determination result in STEP 7 is YES, that is, when there is next dispensing, the process returns to STEP 1. If the determination result in STEP 7 is NO, that is, when there is no next dispensing, the process ends.

For STEP 3 and STEP 4, it is also possible to use different determination functions and threshold values for each of a plurality of types of abnormalities including one of clogging, air sucking, bubble sucking or normality of a plurality of conditions.

For example, first, for detection of the clogging, an abnormality is detected using the Mahalanobis distance, and after abnormal data is removed, for detection of the air sucking or the bubble sucking, a linear combination Formula which is the determination formula is considered to be used.

In the above example, the pressure variation at the time of suction of the specimen or the reagent in the dispensing mechanism is detected and processed, but the pressure variation at the time of ejection of the specimen or the reagent is also similarly processed.

(3) Effects of Present Embodiment

Effects of the first embodiment configured as described above will be described.

The automatic analyzer using the Mahalanobis distance for the technique of detecting the dispensing abnormality had two problems caused by a Mahalanobis distance calculation formula. A first problem is that the determination performance is influenced by the configuration balance of the data constituting the reference database, and a second problem is that the calculation amount is enormously increased as the number of feature quantities increases.

On the other hand, in the first embodiment, the determination function is indicated by the linear combination formula, and thus the calculation amount is small even though the number n of feature quantities is increased. Further, the determination formula may include a small number of non-linear terms in addition to the linear combination formula.

In the first embodiment, the parameters are calculated using the cost function q that converges to 0 or 1 when the distance h from the determination surface is away from 0 so that the sum is minimized, and the determination function is decided, and thus the decided determination surface is a surface that optimally separates an n-dimensional data space.

Figure 10:
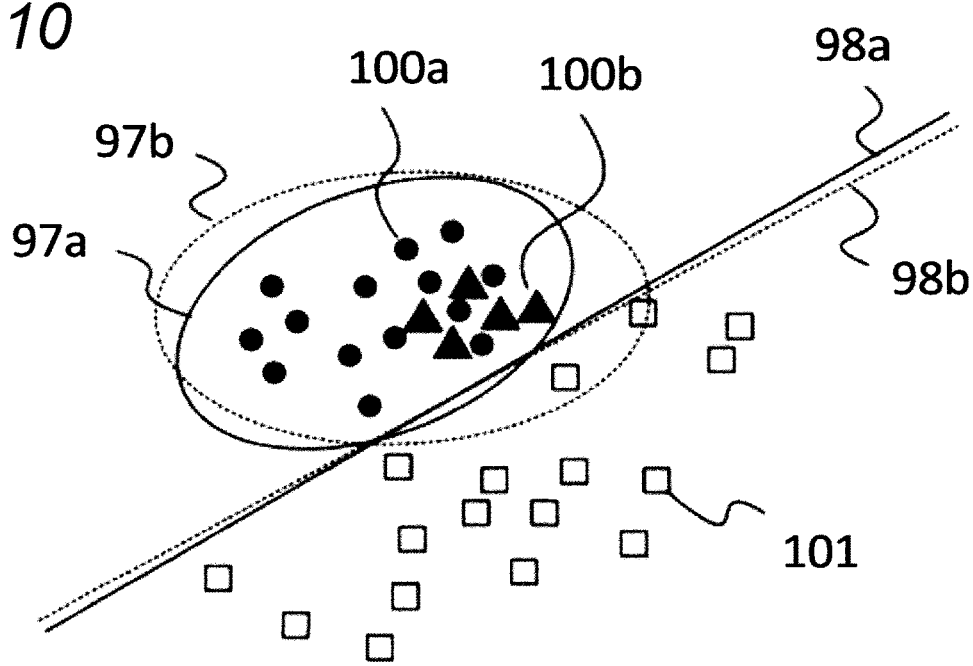
FIG. 10 is a diagram for describing a feature of decision of a determination surface using a method according to the first embodiment.

FIG. 10 is a diagram for describing a feature of decision of the determination surface by the method of the first embodiment. In FIG. 10, data points (normal) of a reference 1 which is a distribution on a feature variable plane when the number n of feature quantities is 2 are 100a (black circles) and 100b (black triangles), and a data point (abnormal) of a reference 2 is 101 (squares). Further, determination lines according to the method of the first embodiment are 98a and 98b, and determination lines according to a method of the related art are 97a and 97b.

The determination line 98a is a determination formula obtained by the data 100a of the reference 1 which is normal and the reference data 101 which is abnormal. The determination line 98b is a determination formula obtained by adding 100b to the normal reference data 100a.

The determination line 97a is a determination formula obtained by the method of the related art using the normal reference data 97a and the Mahalanobis distance, and the determination line 97b is a determination formula obtained by the method of the related art using the Mahalanobis distance by adding the normal reference data 97b to the normal reference data 97a.

In the case of the method of the related art, since the determination line is drawn by the Mahalanobis distance which is the distance from the center of gravity of the distribution of the reference data, if the reference data is changed, the position of the determination line changes greatly, and the determination performance is unstable.

On the other hand, in the case of the first embodiment, it is possible to set the determination line at a position at which the determination is optimized without depending on the center of gravity of the distribution of the reference data, and thus even though the distribution of the reference data changes, the change in the positions of the determination lines 98a and 98b is small, and the stable determination performance can be achieved.

Further, in the case of the first embodiment, since the determination formula is hardly influenced by the center of gravity of the distribution of the reference data, high-performance determination can be achieved even though the reference data acquisition condition is slightly unbalanced.

Further, in the case of the first embodiment, even when there is a change in the normality or abnormality condition that is initially decided due to a change in the use condition of the automatic analyzer or the like, it is preferable to add the reference data later and re-calculates the coefficient of the determination function. In this case, when the added condition is located near the determination surface, the coefficient of the determination function is adjusted, and the slope of the determination surface is appropriately changed. When the added condition is away from the determination surface, it has little influence on the determination surface.

Further, since the number n of feature quantities is set to 2 for the sake of simplicity in FIG. 10, the optimum position of the determination line can be easily imagined on the graph, but when n is 3 or more, the optimum slope and position of the determination surface are unable to be imagined, and optimization using a computer is necessary.

Second Embodiment

Next, a second embodiment of the present invention will be described. The second embodiment relates to an example in which two determination functions are used. An overall configuration of an automatic analyzer to which the second embodiment is applied, the sample dispensing mechanism, and the reagent dispensing mechanism are similar to those of the first embodiment, and thus illustration and detailed description thereof are omitted.

Further, the control device 90 has a similar configuration to that of the first embodiment, and thus illustration and detailed description thereof are omitted. The determination function calculating unit 94 calculates a determination function $f_A$ and a determination function $f_B$ to be described later, and the dispensing process abnormality determining unit 95 performs determination on an operation result of each of the determination function $f_A$ and the determination function $f_B$.

Further, since the operation of the abnormality determination process in the second embodiment is similar to the flowchart illustrated in FIG. 9, illustration and detailed description thereof are omitted. However, in STEP 3, the determination function $f_A$ and the determination function $f_B$ to be described later, are calculated, and in STEP 4, determination is performed on an operation result of each of the determination function $f_A$ and the determination function $f_B$.

Figure 11:
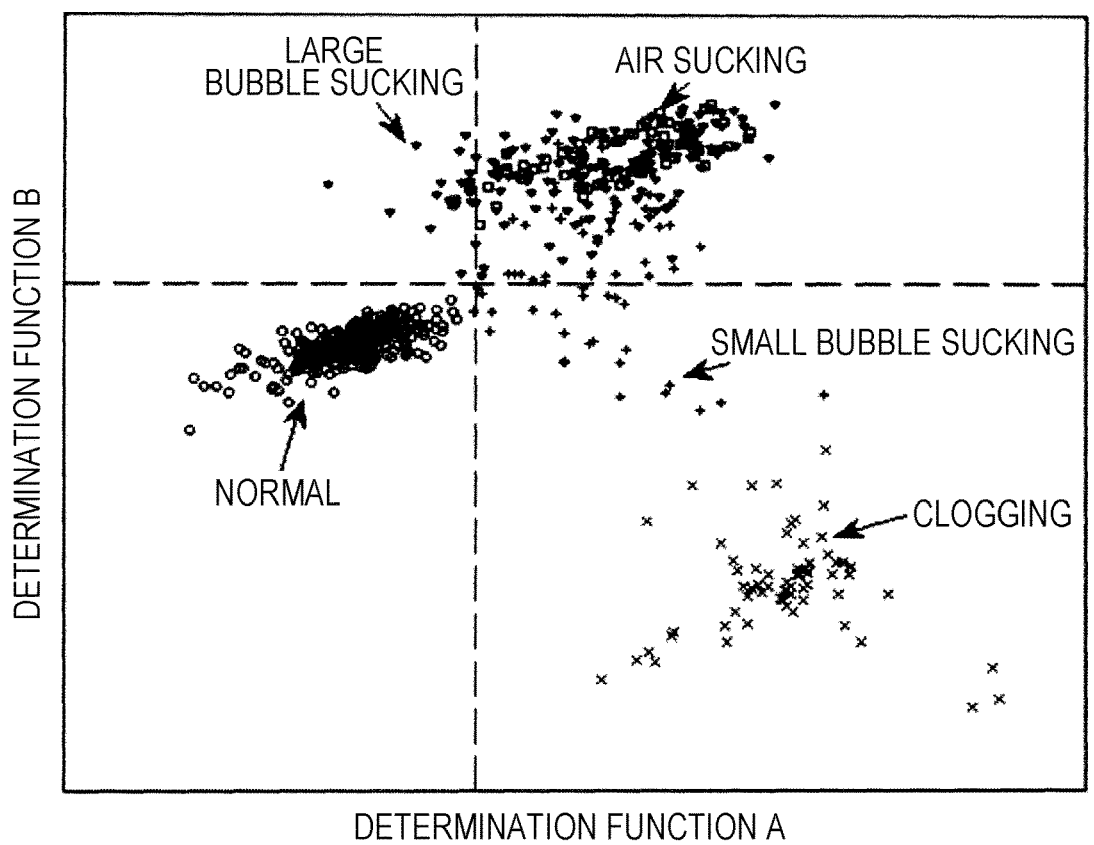
FIG. 11 is an explanatory view of a second embodiment.

The second embodiment will be described with reference to FIG. 11. FIG. 11 is an explanatory view of the second embodiment. In FIG. 11, a horizontal axis indicates the determination function $f_A$ obtained using the normal case as the reference data group 1 and clogging and small bubble sucking as the reference data group 2, and a vertical axis indicates the determination function $f_B$ obtained using the normal case as the reference data group 1 and air sucking and large bubble sucking as the reference data group 2. In FIG. 11, the determination function $f_A$ is illustrated as a determination function A, and the determination function $f_B$ is described as a determination function B.

Parameters of each of the determination functions $f_A$ and $f_B$ are decided and defined similarly to the determination function f of Formula (2) described above (the parameters of each of the determination functions $f_A$ and $f_B$ are set).

Even though it is difficult to perform determination with one determination function, if a type of abnormality is classified into two or more, each determination formula is decided, and an abnormality determination is performed using each determination formula, it is possible to increase the accuracy of determination. The determination formula may be similar to that of the first embodiment.

In the second embodiment, similar effects to those of the first embodiment can be obtained, and since the determination functions $f_A$ and $f_B$ are linear combination formulas, similarly to the determination function f, the calculation amount does not increase even when a plurality of determination formulas are used.

Further, in the case of the second embodiment, it is possible to select a device operation according to a type of abnormality using a determination result of each determination formula individually.

In the above example, the type of abnormality is classified into two or more, but the normal condition may be classified into two or more.

Third Embodiment

Next, a third embodiment of the present invention will be described. An overall configuration of the automatic analyzer to which the third embodiment is applied, the sample dispensing mechanism, and the reagent dispensing mechanism are similar to those of the first embodiment, and thus illustration and detailed description thereof are omitted.

Further, the control device 90 and operations of the abnormality determination process are similar to those of the first embodiment, and thus illustration and detailed description thereof are omitted.

Figure 12:
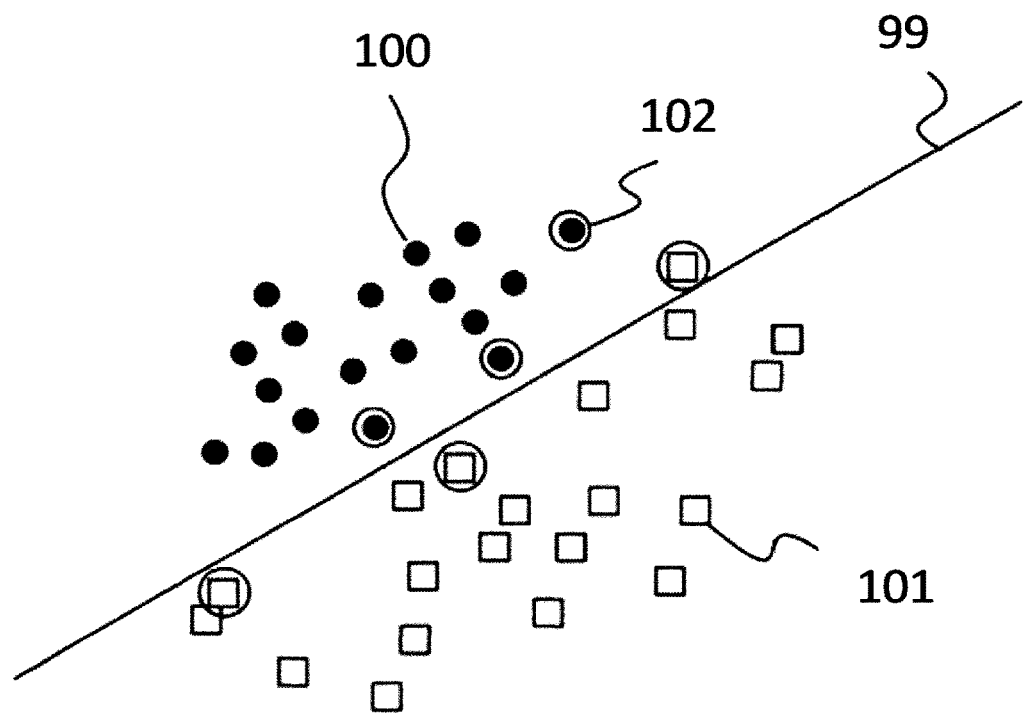
FIG. 12 is a conceptual diagram illustrating a method of obtaining a coefficient of a determination function according to a third embodiment.

In the third embodiment, the third embodiment differs from the first embodiment in a method of obtaining the coefficients (parameters) of the determination function. FIG. 12 is a conceptual diagram illustrating a method of obtaining the determination function in the third embodiment.

In FIG. 12, in order to obtain a determination line 99 for determining normal data points 100 (black circles) of a reference 1 and abnormal data points 101 (rectangles) of a reference 2, a small number of data points related to decision of the determination formula (points surrounded by circles) are selected instead of using all the data points, and the determination function is decided using the data points 102. The selected data is referred to as a "support vector." The support vector can be selected using a technique called a support vector machine, and it can be calculated with commercially available application software such as MATLAB (registered trademark).

The support vector is selected from both the reference 1 and the reference 2. If the number of support vectors is indicated by "r," and a feature quantity of a j-th support vector is indicated by $x_{j,i}, x_{j,2}, \ldots x_{j,n}$, the following Formula (5) is calculated using a weighting coefficient $\alpha_j$ calculated by the support vector machine.

$$ki = \alpha_1 x_{1,i} + \alpha_2 x_{2,i} + \ldots + \alpha_r x_{r,i} \quad (5)$$

In Formula (5), the j-th $\alpha_j$ has a positive value in the support vector of the reference 1 and a negative value in the support vector of the reference 2.

The determination function f of Formula (2) is decided using the coefficients $k_1, k_2, \ldots, k_n$ obtained using Formula (5) and an intercept C separately calculated by the support vector machine.

The determination formula is similar to Formulas (3) and (4).

In the third embodiment of the present invention, similar effect to those of the first embodiment can be obtained. In the case of the second embodiment, since the determination formula is decided using only the reference data having large influence on the determination, the influence of the reference data at a position away from the determination surface is small, and the stable determination performance that hardly depends on the distribution of the reference data is obtained.

In the above example, the reagent dispensing mechanisms 60 and 70 are configured to determine a suction or ejection abnormality of the reagent similarly to the sample dispensing mechanism 50, but the abnormality determination of the present invention may be applied only to the sample dispensing mechanism. Further, it is also possible to apply the abnormality determination of the present invention only to the reagent dispensing mechanism.

REFERENCE SIGNS LIST

10 sample disk (sample disk)
11 specimen container
20 first reagent disk
21 reagent container
30 second reagent disk
31 reaction container
40 reaction disk
41 reaction container
42 agitating mechanism
43 cleaning mechanism
50 sample dispensing mechanism
51 dispensing nozzle (dispensing probe)
52 throttle section
53 dispensing flow channel
54 pressure sensor
54a A/D converter
55 plunger
56 drive mechanism
57 metering pump
58 valve
59 pump
60 first reagent dispensing mechanism
70 second reagent dispensing mechanism
80 photometric mechanism
90 control device
91 input device
92 display device
93 storage unit
94 determination function calculating unit
95 dispensing process abnormality determining unit
96 pressure signal processing unit
200 determining unit
201 analyzing unit
202 control command unit
300 control unit
1000 analysis processing mechanism

The invention claimed is:
1. An automatic analyzer, comprising:
a reaction disk on which a plurality of reaction containers are arranged;
a sample dispensing mechanism including a sample dispensing nozzle that sucks a sample contained in a sample container and ejects the sample to a reaction container arranged on the reaction disk;
a reagent disk on which a plurality of reagent containers are arranged;
a reagent dispensing mechanism including a reagent dispensing nozzle that sucks a reagent contained in a reagent container, of the plurality of reagent containers, and ejects the reagent to the reaction container arranged on the reaction disk;
a spectroscopic detector that detects light transmitting through a solution, containing at least the reagent and the sample, contained in the reaction container;
a first pressure sensor that detects internal pressure of the sample dispensing nozzle; and
a processor programmed to control operations of the reaction disk, the sample dispensing mechanism, the reagent disk, the reagent dispensing mechanism, and the spectroscopic detector,
wherein the processor is further programmed to:
calculate a plurality of feature quantities from a waveform of the pressure of the sample dispensing nozzle detected by the first pressure sensor during a suction or ejection operation by the sample dispensing mechanism,
obtain a plurality of predetermined optimized coefficients having been optimized based on applying a cost function to predetermined reference data,
determine a determination function, which is a linear combination formula of the plurality of features quantities using the values of the optimized coefficients, and calculate a single output value which is a result of the determination function, determine whether or not the sample is normally sucked or ejected by the sample nozzle based on whether the calculated single output value is greater than or equal to a threshold value; and a display device configured to display a notification when it is determined that the sample is not normally sucked or ejected.

2. The automatic analyzer according to claim 1, further comprising:

wherein the processor is further programmed to:

when the sample is determined not to be normally sucked or ejected by the sample nozzle, cause information indicating that there is a dispensing abnormality to be displayed on the display device, and control the reaction disk, the sample dispensing mechanism, the reagent disk, the reagent dispensing mechanism, and the spectroscopic detector such that an analysis operation for a next sample is performed.

3. The automatic analyzer according to claim 1, further comprising:

a second pressure sensor that detects internal pressure of the reagent dispensing nozzle, wherein the determination function is a first determination function and the single output value is a first single output value, and wherein the processor is further programmed to:

calculate a plurality of feature quantities from a waveform of the pressure of the reagent dispensing nozzle detected by the second pressure sensor, determine a second determination function, which is a linear combination formula of the plurality of features quantities from the waveform detected by the second pressure sensor using the values of the optimized coefficients, and calculate a second single output value from the determination function, and determine whether or not the reagent is normally sucked or ejected by the reagent nozzle based on the calculated second single output value.

4. The automatic analyzer according to claim 1, wherein the predetermined reference data used to optimize the coefficients of the determination function are based on internal pressure waveform data previously acquired in the sample dispensing nozzle under a normal condition and internal pressure waveform data under an abnormal condition.

5. The automatic analyzer according to claim 1, wherein a number of the plurality of feature quantities is 40 or more.

6. The automatic analyzer according to claim 1, wherein the processor is further programmed to:

change operation control for the reaction disk, the sample dispensing mechanism, the reagent disk, the reagent dispensing mechanism, and the spectroscopic detector in accordance with a determined type of the abnormal suction or ejection, wherein the type of the abnormal suction or ejection includes at least one of clogging, air sucking, and bubble sucking.

* * * * *